United States Patent
Nagai et al.

(10) Patent No.: US 7,223,937 B2
(45) Date of Patent: May 29, 2007

(54) LASER BEAM PROCESSING METHOD AND LASER BEAM PROCESSING MACHINE

(75) Inventors: Yusuke Nagai, Tokyo (JP); Satoshi Kobayashi, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 11/255,999

(22) Filed: Oct. 24, 2005

(65) Prior Publication Data

US 2006/0086704 A1    Apr. 27, 2006

(30) Foreign Application Priority Data

Oct. 27, 2004    (JP) .............................. 2004-311834

(51) Int. Cl.
*B23K 26/38*    (2006.01)
*B23K 26/067*    (2006.01)

(52) U.S. Cl. ..................... 219/121.72; 219/121.67; 219/121.76

(58) Field of Classification Search ........... 219/121.68, 219/121.69, 121.72, 121.67, 121.76, 121.77
See application file for complete search history.

(56) References Cited

U.S. PATENT DOCUMENTS

| | | | |
|---|---|---|---|
| 6,211,488 B1 | 4/2001 | Hoekstra et al. | |
| 6,417,485 B1 * | 7/2002 | Troitski | 219/121.69 |
| 2004/0232124 A1 * | 11/2004 | Nagai et al. | 219/121.72 |
| 2005/0189330 A1 * | 9/2005 | Fukuyo et al. | 219/121.72 |

FOREIGN PATENT DOCUMENTS

| | | | | |
|---|---|---|---|---|
| JP | 3-13290 A | * | 1/1991 | |
| JP | 2000-31564 A | * | 1/2000 | |
| JP | 2002-273592 A | * | 9/2002 | |
| JP | 3408805 | | 3/2003 | |
| JP | 2004-34120 A | * | 2/2004 | |

* cited by examiner

*Primary Examiner*—Geoffrey S. Evans
(74) *Attorney, Agent, or Firm*—Smith, Gambrell & Russell, LLP

(57) ABSTRACT

A laser beam processing method for forming deteriorated layers along a dividing line in the inside of a workpiece by applying a pulse laser beam of a wavelength capable of passing through the workpiece along the dividing line formed on the workpiece, wherein a plurality of pulse laser beams are applied with a predetermined space therebetween in the width direction of the dividing line to form a plurality of parallel deteriorated layers along the dividing line.

13 Claims, 5 Drawing Sheets

LASER BEAM PROCESSING METHOD AND LASER BEAM PROCESSING MACHINE

FIELD OF THE INVENTION

The present invention relates to a laser beam processing method and a laser beam processing machine for forming deteriorated layers in the inside of a workpiece by applying a pulse laser beam of a wavelength capable of passing through the workpiece.

DESCRIPTION OF THE PRIOR ART

In the production process of a semiconductor device, a plurality of areas are sectioned by dividing lines called "streets" arranged in a lattice pattern on the front surface of a wafer comprising a suitable substrate such as a silicon substrate, sapphire substrate, silicon carbide substrate, lithium tantalite substrate, glass substrate or quartz substrate, and a circuit (function element) such as IC or LSI is formed in each of the sectioned areas. Individual semiconductor chips are manufactured by cutting this semiconductor wafer along the dividing lines to divide it into the areas each having a circuit formed thereon. Various methods making use of a laser beam have been proposed to divide the wafer.

U.S. Pat. No. 6,211,488 and Japanese Patent No. 3408805 disclose a wafer dividing method comprising the steps of converging a pulse laser beam of a wavelength capable of passing through a wafer in an intermediate portion in the thickness direction of the wafer and moving the pulse laser beam and the wafer relative to each other along dividing lines to form a deteriorated layer in the intermediate portion in the thickness direction of the wafer along the dividing lines and exerting external force on the wafer to divide it along the deteriorated layers.

However, the width of the deteriorated layer formed by the above laser processing is around 1 µm and hence, this width is not always satisfactory as the width required for division. Therefore, when external force is applied to the wafer to divide it along the dividing lines, the chips may be damaged.

SUMMARY OF THE INVENTION

It is an object of the present invention to provide a laser beam processing method and a laser beam processing machine, which are capable of forming a deteriorated layer having a width that enables a workpiece to be easily divided by applying external force.

To attain the above object, according to the present invention, there is provided a laser beam processing method for forming deteriorated layers along a dividing line in the inside of a workpiece by applying a pulse laser beam of a wavelength capable of passing through the workpiece along the dividing line formed on the workpiece, wherein a plurality of pulse laser beams are applied, with a predetermined space therebetween, in the width direction of a dividing line to form a plurality of parallel deteriorated layers along the dividing line.

The above predetermined space is set to 1 to 5 µm.

According to the present invention, there is further provided a laser beam processing machine comprising a chuck table for holding a workpiece, a laser beam application means for applying a pulse laser beam of a wavelength capable of passing through the workpiece to the workpiece held on the chuck table, and a processing-feed means for moving the chuck table and the laser beam application means relative to each other, the laser beam application means comprising a laser beam oscillation means and a transmitting/converging means composed of an optical transmitting means for transmitting a pulse laser beam oscillated by the laser beam oscillation means and one condensing lens for converging the pulse laser beam transmitted by the optical transmitting means, wherein the transmitting/converging means converges the pulse laser beam oscillated by the laser beam oscillation means through the one condensing lens at two or more focusing points which are displaced from each other with a predetermined space therebetween in a direction perpendicular to a processing-feed direction.

The above optical transmitting means comprises a path distribution means for distributing a pulse laser beam oscillated by the pulse laser beam oscillation means to a first path and a second path and a focusing point position displacing means that is installed in any one of the first path and the second path and displaces the focusing point of one beam, which passes through the one path and is converged by the one condensing lens, in a direction perpendicular to the processing-feed direction.

The above path distribution means is composed of a beam splitter for dividing a pulse laser beam oscillated by the laser beam oscillation means into the first path and the second path.

The above path distribution means has a polarization conversion means for dividing a pulse laser beam oscillated by the pulse laser beam oscillation means into vertically polarized beam and horizontally polarized beam alternately and a beam splitter for dividing the vertically polarized beam and the horizontally polarized beam divided by the polarization conversion means into the first path and the second path, respectively. The above polarization conversion means comprises a modulator for dividing a pulse laser beam oscillated by the pulse laser beam oscillation means into vertically polarized beam and horizontally polarized beam alternately and a pulse generator for providing a sync signal for setting a repetition frequency (f) to the pulse laser beam oscillation means and a sync signal having a frequency (f)/2 to the modulator. The above modulator for dividing the pulse laser beam into vertically polarized beam and horizontally polarized beam alternately is composed of a modulation element making use of an electrooptic effect.

The above path distribution means has a modulator for dividing the pulse laser beam oscillated by the pulse laser beam oscillation means to the first path and the second path alternately and a pulse generator for providing a sync signal for setting a repetition frequency (f) to the pulse laser beam oscillation means and a sync signal having a frequency (f)/2 to the modulator. The modulator for dividing the pulse laser beam to the two paths alternately is composed of a modulation element making use of an acoustic optic effect.

The above focusing point position displacing means comprises a plurality of mirrors, and a displacement of the focusing point of one of the laser beams is changed by altering the installation angles of the plurality of mirrors.

According to the present invention, there is further provided a laser beam processing machine comprising a chuck table for holding a workpiece, a laser beam application means for applying a pulse laser beam of a wavelength capable of passing through the workpiece to the workpiece held on the chuck table, and a processing-feed means for moving the chuck table and the laser beam application means relative to each other, the laser beam application means comprising a plurality of laser beam oscillation means and a transmitting/converging means composed of an optical transmitting means for transmitting pulse laser beams oscillated by the plurality of laser beam oscillation means and one condensing lens for converging pulse laser beams transmitted by the optical transmitting means; wherein the laser beam application means comprises a plurality of laser beam oscillation means; and the transmitting/converging means converges a plurality of pulse laser beams oscillated by the plurality of laser beam oscillation means through the one condensing lens at a plurality of focusing points which are displaced from each other with a predetermined space therebetween in a direction perpendicular to the processing-feed direction.

Preferably, the above laser beam application means has a pulse generator for controlling the oscillation timings of pulse laser beams oscillated by the plurality of laser beam oscillation means.

In the present invention, since a plurality of parallel deteriorated layers are formed along the dividing line in the inside of the workpiece by applying a plurality of pulse laser beams with a predetermined space therebetween in the width direction of the dividing line formed on the workpiece, the deteriorated layers having a width that enables the wafer to be easily divided by exerting external force on the workpiece can be formed.

DETAILED DESCRIPTION OF THE PREFERRED EMBODIMENTS

Preferred embodiments of a laser beam processing method and a laser beam processing machine of the present invention will be described in detail hereinunder with reference to the accompanying drawings.

Figure 1:
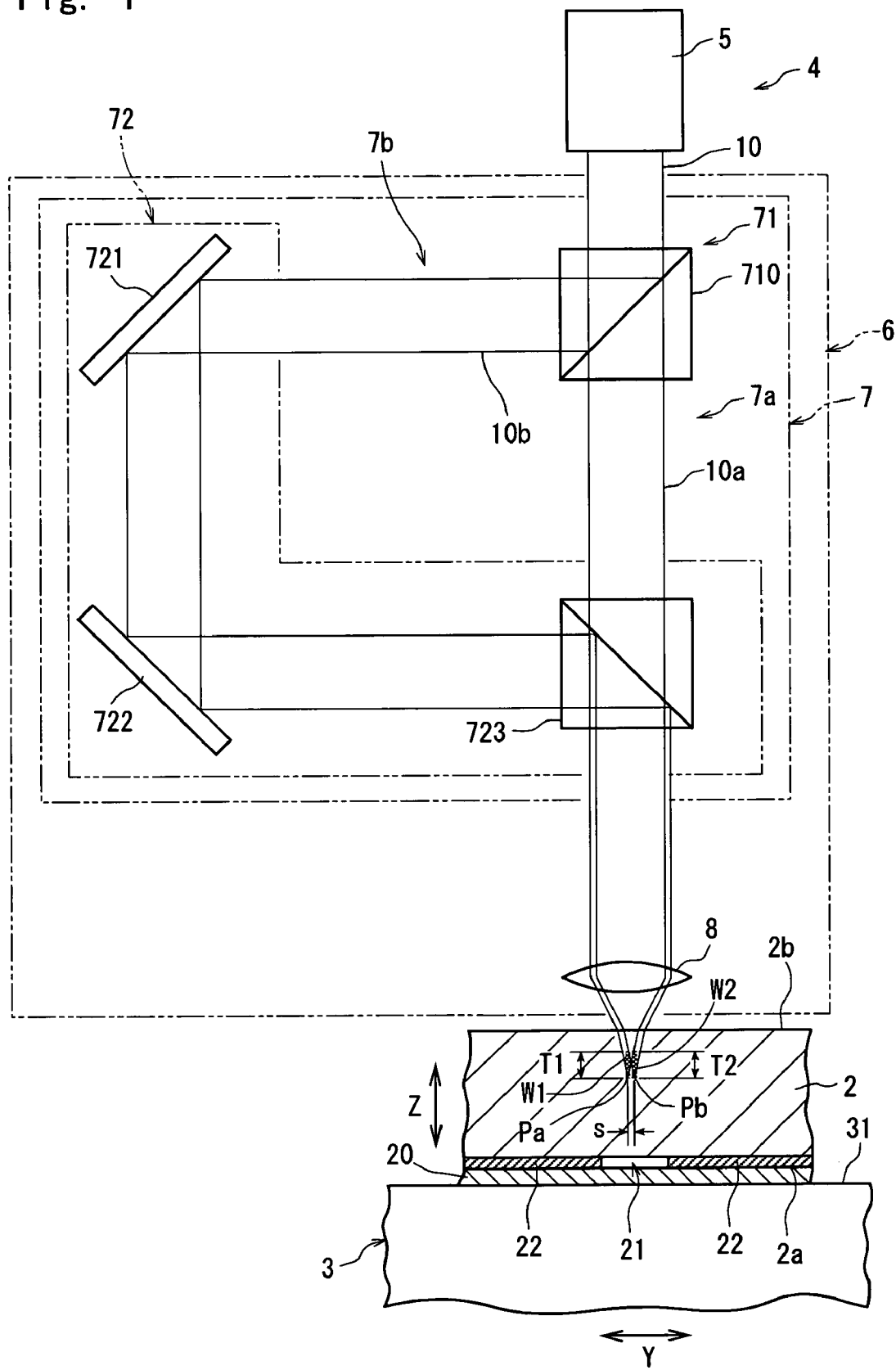
FIG. 1 is a schematic diagram of a first embodiment of a laser beam processing machine constituted according to the present invention.
Figure 2:
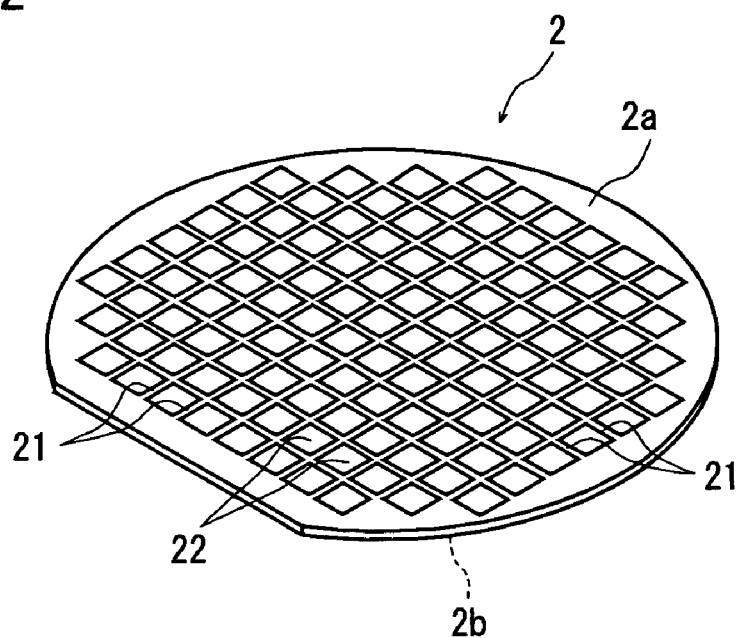
FIG. 2 is a perspective view of a wafer as a workpiece to be processed by the laser beam processing method of the present invention.

FIG. 1 is a schematic diagram of a first embodiment of a laser beam processing machine constituted according to the present invention. The illustrated machine comprises a chuck table 3 for holding a wafer 2 as a workpiece and a schematic laser beam application means denoted by 4. The wafer 2 as a workpiece will be described hereinunder with reference to FIG. 2. The wafer 2 shown in FIG. 2 is, for example, a silicon wafer having a thickness of 300 µm, and a plurality of dividing lines 21 are formed in a lattice pattern on the front surface 2a. A circuit 22 as a function element is formed in each of a plurality of areas sectioned by the plurality of dividing lines 21 on the front surface 2a of the semiconductor wafer 2.

The chuck table 3 comprises an adsorption chuck 31 made from a porous member or having a plurality of suction holes or grooves, and the adsorption chuck 31 is communicated with a suction means that is not shown. Therefore, a protective tape 20 side affixed to the front surface 2a on which a circuit 22 is formed, of the wafer 2 as the workpiece is placed on the adsorption chuck 31, and the wafer 2 is suction-held on the chuck table 3 by activating the suction means that is not shown. The thus constituted chuck table 3 is so constituted as to be moved in a processing-feed direction perpendicular to the sheet in FIG. 1 by a processing-feed means that is not shown. Therefore, the chuck table 3 and the laser beam application means 4 can move relative to each other in the processing-feed direction perpendicular to the sheet in FIG. 1. Further, the chuck table 3 is also so constituted as to be moved in an indexing-feed direction indicated by an arrow Y in FIG. 1 by an indexing-feed means that is not shown. Therefore, the chuck table 3 and the laser beam application means 4 can move relative to each other in the indexing-feed direction indicated by the arrow Y in FIG. 1, which is perpendicular to the processing-feed direction.

The laser beam application means 4 comprises pulse laser beam oscillation means 5 and transmitting/converging means 6 for transmitting and converging a pulse laser beam oscillated by the pulse laser beam oscillation means 5. The pulse laser beam oscillation means 5 oscillates a pulse laser beam 10 of a wavelength capable of passing through the wafer 2 as the workpiece. As this pulse laser beam oscillation means 5 may be used a YVO4 pulse laser beam oscillator or YAG pulse laser oscillator for oscillating a pulse laser beam 10 having a wavelength of 1,064 nm, for example, when the wafer 2 is a wafer comprising a silicon substrate, silicon carbide substrate, lithium tantalite substrate, glass substrate or quartz substrate.

The transmitting/converging means 6 constituting the above laser beam application means 4 is interposed between the pulse laser beam oscillation means 5 and the wafer 2 as the workpiece held on the chuck table 3. The transmitting/converging means 6 in the illustrated embodiment comprises an optical transmitting means 7 for transmitting a pulse laser beam oscillated by the pulse laser beam oscillation means 5 and a condensing lens 8 such as an objective lens for converging a pulse laser beam transmitted by the optical transmitting means 7. The optical transmitting means 7 comprises a beam splitter 710 as a path distribution means 71 and a focusing point position displacing means 72 for displacing the focusing point of a laser beam in an indexing-feed direction indicated by an arrow Y which is perpendicular to the processing-feed direction of the wafer 2 as the workpiece held on the chuck table 3. The focusing point position displacing means 72 is composed of a first mirror 721, a second mirror 722 and a beam splitter 723.

In the above laser beam processing machine, the pulse laser beam 10 oscillated from the pulse laser beam oscillation means 5 is divided to a first path 7a and a second path 7b by the beam splitter 710. That is, the pulse laser beam oscillated from the pulse laser beam oscillation means 5 is divided into a first pulse laser beam 10a which goes straight to the first path 7a through the beam splitter 710 and a second pulse laser beam 10b that is reflected by the beam splitter 710 to change its direction substantially at a right angle and passes through the second path 7b. The first pulse laser beam 10a passes through the beam splitter 723 and is converged at a focusing point Pa in the inside of the wafer 2 as the workpiece by the condensing lens 8.

Meanwhile, the second pulse laser beam 10b is reflected by the first mirror 721 and the second mirror 722 as the focusing point position displacing means 72 at angles corresponding to their installation angles and further by the beam splitter 723 at an angle corresponding to its installation angle. Then, the second pulse laser beam 10b reflected by the beam splitter 723 reaches the condensing lens 8. The focusing point Pb of the second pulse laser beam 10b that enters the condensing lens 8 and is converged by the condensing lens 8 is displaced from the focusing point Pa of the first pulse laser beam 10a by a predetermined space "S" in the indexing-feed direction indicated by the arrow Y in FIG. 1, that is, in the width direction (right-and-left direction in FIG. 1) of the dividing line 21 formed on the wafer 2. This displacement "S" can be suitably changed by altering the installation angles of the first mirror 721 and the second mirror 722. The above space "S" is suitably 1 to 5 μm.

After the first pulse laser beam 10a is converged at the focusing point Pa, a deteriorated layer W1 is formed in the wafer 2 as the, workpiece near the focusing point Pa, generally in an area having a thickness T1 from the focusing point Pa in an upward direction. After the second pulse laser beam 10b is converged at the focusing point Pb, a deteriorated layer W2 is formed in the wafer 2 as the workpiece near the focusing point Pb, generally in an area having a thickness T2 from the focusing point Pb in an upward direction. The deteriorated layers formed in the wafer 2 as the workpiece are generally molten and re-solidified (that is, molten when the pulse laser beams 10a and 10b are converged and then, solidified after the convergence of the pulse laser beams 10a and 10b), and result in voids or cracks, though this depends on the material of the wafer 2 or the intensities of the converged pulse laser beams 10a and 10b.

Figure 3:
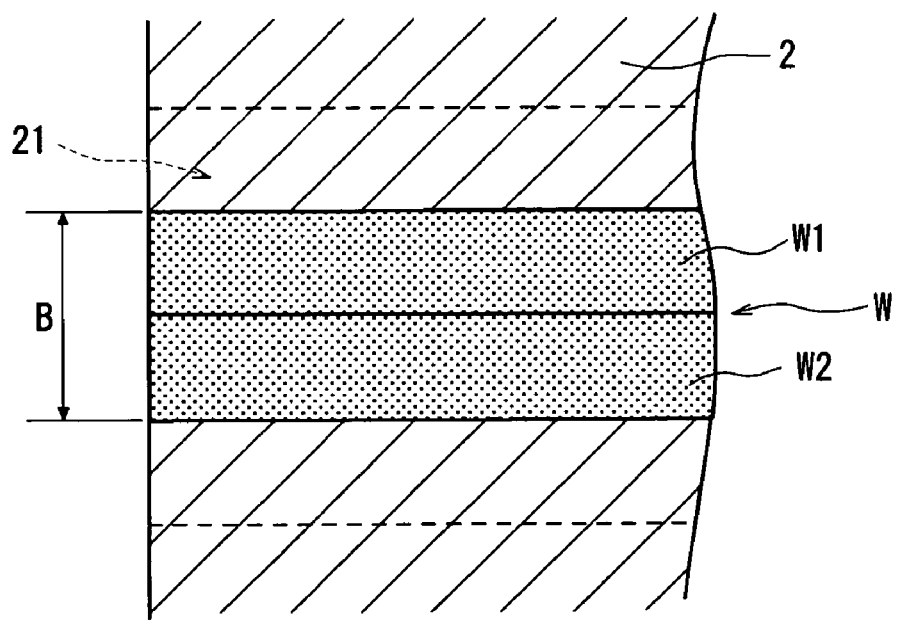
FIG. 3 is a schematic diagram showing a state where two deteriorated layers are formed at the same time in the inside of the wafer as the workpiece by the laser beam processing machine shown in FIG. 1.

The laser beam processing machine in the illustrated embodiment moves the chuck table 3 (therefore, the wafer 2 as the workpiece held on the chuck table 3) in the processing-feed direction perpendicular to the sheet in FIG. 1 while a pulse laser beam is applied as described above. As a result, two parallel deteriorated layers W1 and W2 are formed at the same time along a predetermined dividing line 21 in the inside of the wafer 2 as shown in FIG. 3. Thus, a deteriorated layer W having a width B and consisting of the two parallel deteriorated layers W1 and W2 is formed along the dividing line 21 in the wafer 2 as the workpiece. This deteriorated layer W has a width B that allows the wafer 2 to be easily broken by exerting external force.

The laser processing conditions are set as follows, for example.

Light source: LD excited Q switch Nd:YVO4 pulse laser
Wavelength: 1,064 nm
Focusing spot diameter: 1 μm
Pulse width: 100 ns
Peak power density: $1.3 \times 10^{10}$ W/cm$^2$
Repetition frequency: 100 kHz
Processing-feed rate: 100 mm/sec When the wafer 2 as the workpiece is thick and hence, the deteriorated layers W1 and W2 having thicknesses T1 and T2 are not enough for dividing the wafer 2 precisely along the dividing line, the laser beam application means 4 and the chuck table 3 are moved relative to each other a predetermined distance in the direction of the optical axis, that is, the vertical direction indicated by the arrow Z in FIG. 1. Thereby, the focusing point Pa and the focusing point Pb are displaced from each other in the direction of the optical axis, that is, in the thickness direction of the wafer 2 as the workpiece, and the chuck table 3 is moved in the processing-feed direction perpendicular to the sheet in FIG. 1 while a pulse laser beam is applied from the laser beam application means 4. As a result, deteriorated layers W1 and W2 having thicknesses T1 and T2 can be formed in the wafer 2 as the workpiece at positions, which are displaced in the thickness direction in addition to the above deteriorated layers W1 and W2.

A description will be subsequently given of a second embodiment of the laser beam application means 4 with reference to FIG. 4.

Figure 4:
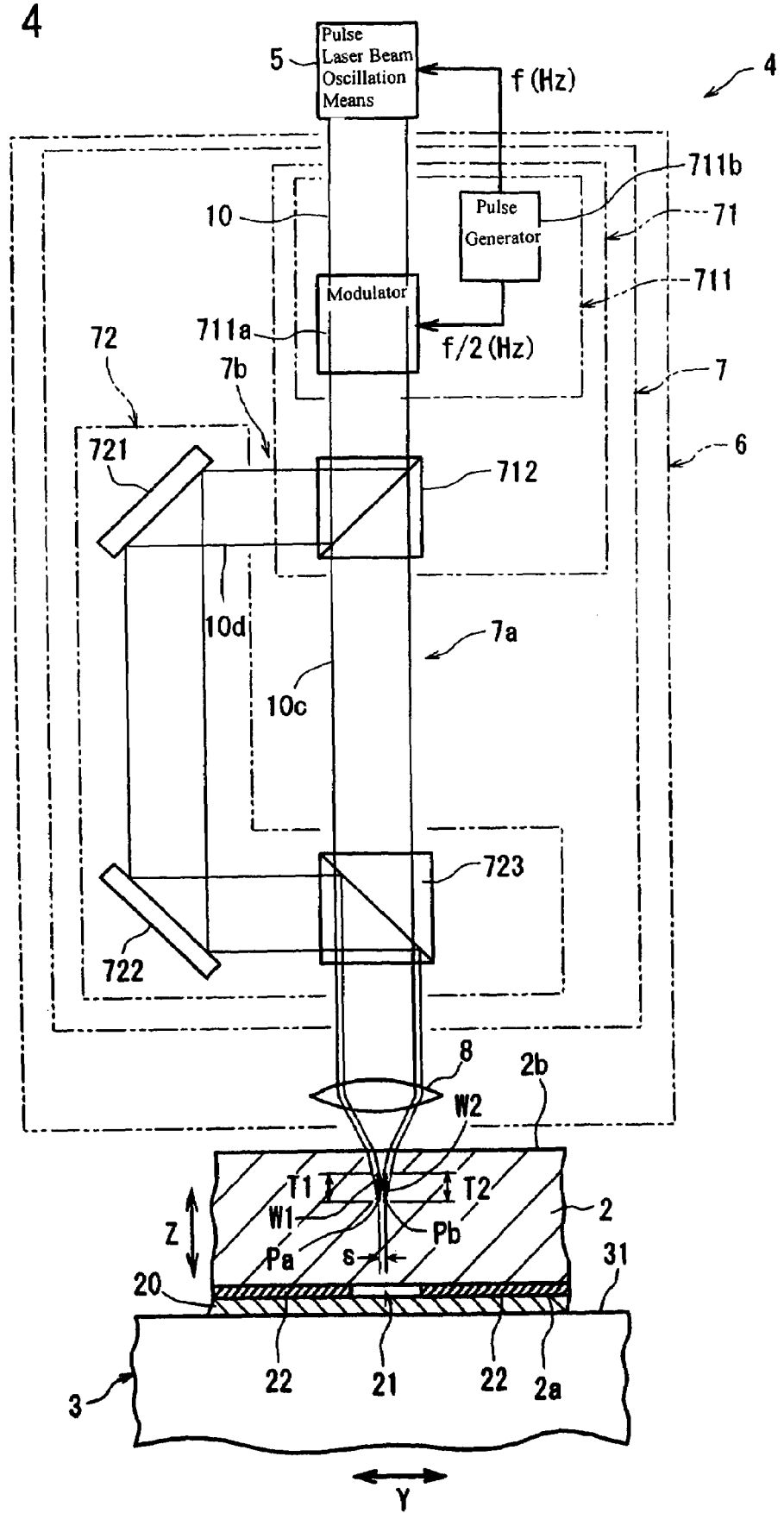
FIG. 4 is a schematic diagram of a second embodiment of the laser beam processing machine constituted according to the present invention.

The laser beam application means 4 shown in FIG. 4 differs from the above laser beam application means 4 shown in FIG. 1 in the path distribution means 71 for distributing a pulse laser beam oscillated by the pulse laser beam oscillation means 5 of the laser beam application means 4 shown in FIG. 1 to the first path 7a and the second path 7b. Since the laser beam application means 4 shown in FIG. 4 is substantially the same as the laser beam application means 4 shown in FIG. 1 in constitution except for a path distribution means 71, the same members are given the same reference symbols and their descriptions are omitted.

The path distribution means 71 of the laser beam application means 4 shown in FIG. 4 comprises polarization conversion means 711 for dividing a pulse laser beam oscillated by the pulse laser beam oscillation means 5 into vertically polarized beam and horizontally polarized beam alternately and a beam splitter 712 for dividing the vertically polarized beam and the horizontally polarized beam divided by the polarization conversion means 711 to the first path 7a and the second path 7b, respectively. The polarization conversion means 711 comprises a modulator 711a for dividing the pulse laser beam oscillated by the pulse laser beam oscillation means 5 into vertically polarized beam and horizontally polarized beam alternately and a pulse generator 711b for providing a sync signal for setting a repetition frequency (f) to the pulse laser beam oscillation means 5 and a sync signal having a frequency (f)/2 to the modulator 711a. As the modulator 711a is used a modulation element making use of an electrooptic effect in the illustrated embodiment.

In the above-described laser beam application means 4, when a pulse laser beam having a repetition frequency f (Hz) is to be oscillated from the pulse laser beam oscillation means 5, a sync signal for setting a repetition frequency (f) is provided from the pulse generator 711b of the polarization conversion means 711 to control the repetition frequency (f) of the pulse laser beam oscillated by the pulse laser beam oscillation means 5. At the same time, the pulse generator 711b provides a sync signal having a frequency (f)/2 that corresponds to a half of the repetition frequency (f) of the signal provided to the pulse laser beam oscillation means 5 to the modulator 711a. As a result, the pulse laser beam 10 oscillated from the pulse laser beam oscillation means 5 is divided into vertically polarized beam and horizontally polarized beam alternately when it passes through the modulator 711a composed of a modulation element making use of an electrooptic effect (provided that polarization at the time of emitting a laser beam is linearly polarized light). As for the division of the pulse laser beam into the vertically polarized beam and the horizontally polarized beam by the polarization conversion means 711, for example, successive two pulses may be divided into vertically polarized beam and the subsequent successive two pulses may be divided to horizontally polarized beam alternately.

The vertically polarized beam and the horizontally polarized beam divided by the modulator 711a of the polarization conversion means 711 alternately are separated from each other as a vertically polarized laser beam 10c and a horizontally polarized laser beam 10d by the beam splitter 712, respectively. That is, the vertically polarized laser beam 10c passes through the beam splitter 712 to go straight to the first path 7a, while the horizontally polarized laser beam 10d is reflected by the beam splitter 712 to change its direction substantially at a right angle to the second path 7b. The vertically polarized laser beam 10c going straight to the first path 7a passes through the beam splitter 723 and is converged at a focusing point Pa in the inside of the wafer 2 as the workpiece by the condensing lens 8.

Meanwhile, the horizontally polarized laser beam 10d branched off to the second path 7b by the beam splitter 712 is reflected by the first mirror 721 and the second mirror 722 as the focusing point position displacing means 72 at angles corresponding to their installation angles and further by the beam splitter 723 at an angle corresponding to its installation angle. The horizontally polarized laser beam 10d reflected by the beam splitter 723 reaches the condensing lens 8. The focusing point Pb of the horizontally polarized laser beam 10d that enters the condensing lens 8 and is converged by the condensing lens 8 is displaced from the focusing point Pa of the vertically polarized laser beam 10c by a predetermined space "S" in the indexing-feed direction indicated by the arrow Y, that is, in the width direction (right-and-left direction in FIG. 4) of the dividing line 21 formed on the wafer 2. This space "S" can be suitably changed by altering the installation angles of the first mirror 721 and the second mirror 722. Since the above vertically polarized laser beam 10c and the horizontally polarized laser beam 10d are output alternately by the modulator 711a of the above polarization conversion means 711, they are converged in the inside of the wafer 2 as the workpiece with a time difference between pulses. Therefore, as the pulse of the vertically polarized laser beam 10c and the pulse of the horizontally polarized laser beam 10d are applied alternately, they do not interfere with each other. By thus applying the vertically polarized laser beam 10c and the horizontally polarized laser beam 10d along the dividing line 21 formed on the wafer 2, deteriorated layers W1 and W2 having desired thicknesses T1 and T2 can be formed at the same time near the focusing point Pa of the vertically polarized laser beam 10c and near the focusing point Pb of the horizontally polarized laser beam 10d, generally in areas from the focusing point Pa and the focusing point Pb in an upward direction, respectively. The chuck table 3 (therefore, the wafer 2 as the workpiece held on the chuck table 3) is then moved in the processing-feed direction perpendicular to the sheet in FIG. 4 while the pulse laser beam is applied as described above, whereby two parallel deteriorated layers W1 and W2 are formed at the same time along the predetermined dividing line 21 in the inside of the wafer 2.

A description will be subsequently given of a third embodiment of the laser beam application means 4 with reference to FIG. 5.

Figure 5:
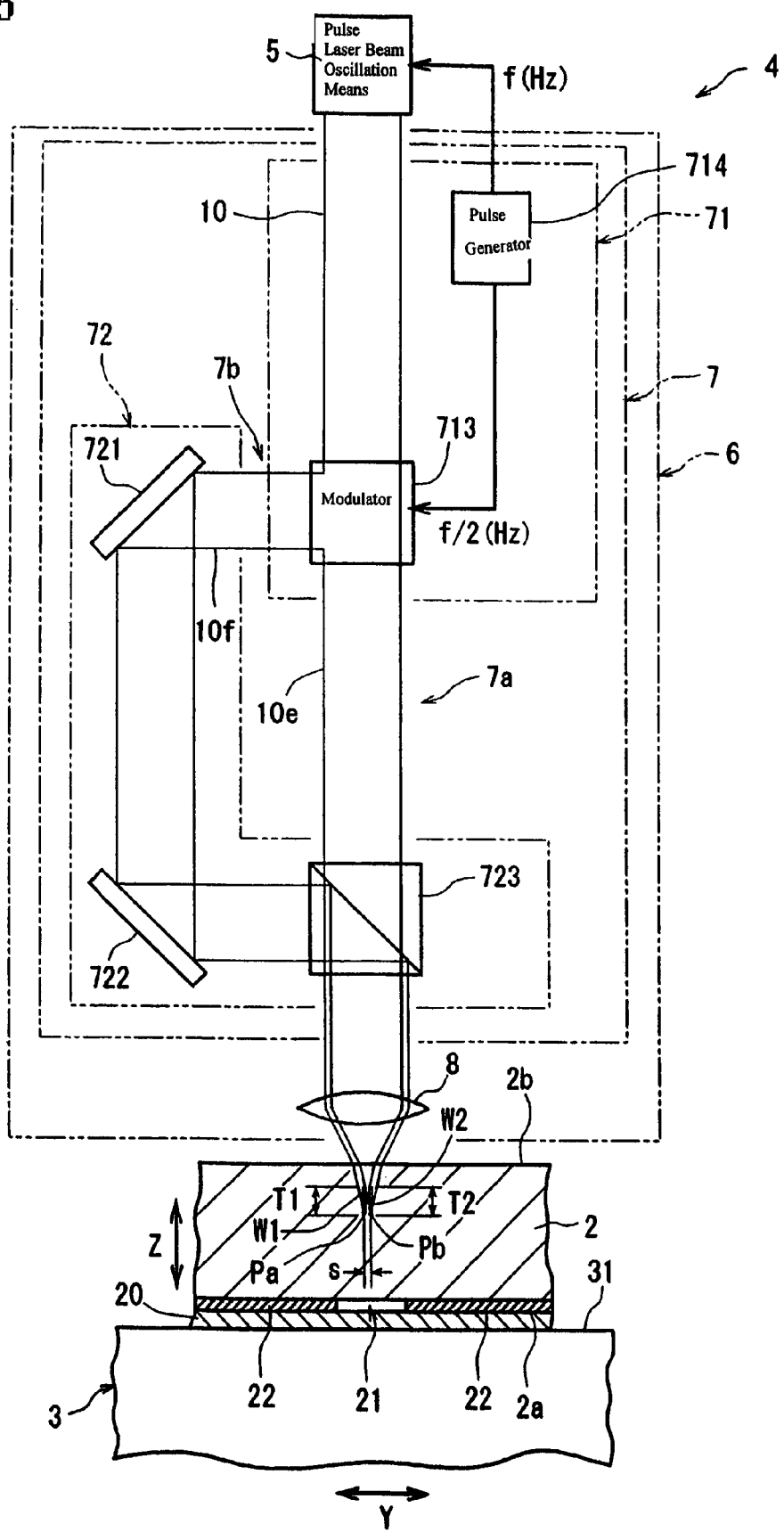
FIG. 5 is a schematic diagram of a third embodiment of the laser beam processing machine constituted according to the present invention.

The laser beam application means 4 shown in FIG. 5 differs from the laser beam application means 4 shown in FIG. 1 and FIG. 4 in the path distribution means 71 for distributing a pulse laser beam oscillated by the pulse laser beam oscillation means 5 of the laser beam application means 4 to the first path 7a and the second path 7b. That is, the path distribution means 71 in the embodiment shown in FIG. 5 comprises a modulator 713 for dividing a pulse laser beam oscillated by the pulse laser beam oscillation means 5 to two different paths alternately and a pulse generator 714 for providing a sync signal for setting a repetition frequency (f) to the pulse laser beam oscillation means 5 and a sync signal having a frequency (f)/2 to the modulator 713. As the modulator 713 is used a modulation element making use of an acoustic-optic effect in the illustrated embodiment. By providing this path distribution means 71, the beam splitter 712 in the laser beam application means 4 shown in FIG. 4 can be omitted. Since the laser beam application means 4 shown in FIG. 5 is substantially the same as the laser beam application means 4 shown in FIG. 1 and FIG. 4 in constitution except for a path distribution means 71, the same members are given the same reference symbols and their descriptions are omitted.

In the laser beam application means 4 shown in FIG. 5, when a pulse laser beam having a repetition frequency f (Hz) is to be oscillated from the pulse laser beam oscillation means 5, a sync signal for setting a repetition frequency (f) is provided from the pulse generator 714 to control the repetition frequency (f) of the pulse laser beam oscillated by the pulse laser beam oscillation means 5. At the same time, the pulse generator 714 provides a sync signal having a frequency (f)/2 that corresponds to a half of the repetition frequency (f) of the signal provided to the pulse laser beam oscillation means 5 to the modulator 713. As a result, the pulse laser beam 10 oscillated from the pulse laser beam oscillation means 5 is divided to two different paths, that is, the first path 7a and the second path 7b alternately when it passes through the modulator 713 composed of a modulation element making use of an acoustic optic effect. For example, odd-numbered pulse laser beams are divided to the first path 7a and even-numbered pulse laser beams are divided to the second path 7b. As for the distribution of the pulse laser beam by the path distribution means 71, for example, successive two pulses may be distributed to the first path 7a and the subsequent successive two pulses may be distributed to the second path 7b alternately.

A first laser beam 10e divided to the first path 7b by the modulator 713 of the path distribution means 71 passes through the beam splitter 723 and is converged at a focusing point Pa in the inside of the wafer 2 as the workpiece by the objective condensing lens 8.

Meanwhile, a second laser beam 10f branched off to the second path 7b by the modulator 713 of the path distribution means 71 is reflected by the first mirror 721 and the second mirror 722 as the focusing point position displacing means 72 at angles corresponding to their installation angles and further by the beam splitter 723 at an angle corresponding to its installation angle. The second pulse laser beam 10f reflected by the beam splitter 723 reaches the condensing lens 8. The focusing point Pb of the second pulse laser beam 10f that enters the condenser 8 and is converged by the condensing lens 8 is displaced from the focusing point Pa of the first pulse laser beam 10e by a predetermined space "S" in the indexing-feed direction indicated by the arrow Y in FIG. 5, that is, in the width direction (right-and-left direction in FIG. 5) of the dividing line 21 formed on the wafer 2. This space "S" can be suitably changed by altering the installation angles of the first mirror 721 and the second mirror 722. Since the above first laser beam 10e and the second laser beam 10f are output alternately by the modulator 713 of the above path distribution means 71, they are converged in the inside of the wafer 2 as the workpiece with a time difference between pulses. Therefore, as the pulse of the first pulse laser beam 10e and the pulse of the second pulse laser beam 10f are applied alternately, they do not interfere with each other. By thus applying the first pulse laser beam 10e and the second pulse laser beam 10f along the dividing line 21 formed on the wafer 2, deteriorated layers W1 and W2 having desired thicknesses T1 and T2 can be formed at the same time near the focusing point Pa of the first laser beam 10e and near the focusing point Pb of the second pulse laser beam 10f, generally in areas from the focusing point Pa and the focusing point Pb in an upward direction, respectively. By moving the chuck table 3 (therefore, the wafer 2 as the workpiece held on the chuck table 3) in the processing-feed direction perpendicular to the sheet in FIG. 5 while the pulse laser beam is applied, two parallel deteriorated layers W1 and W2 are formed at the same time along the predetermined dividing line 21 in the inside of the wafer 2.

A description will be subsequently given of a fourth embodiment of the laser beam application means 4 with reference to FIG. 6. Since the laser beam processing machine shown in FIG. 6 is substantially the same as the laser beam processing machines shown in FIG. 1, FIG. 4 and FIG. 5 except for a laser beam application means 4, the same members are given the same reference symbols and their descriptions are omitted.

The laser beam application means 4 comprises a first pulse laser beam oscillation means 5a, a second pulse laser beam oscillation means 5b, a pulse generator 9 for controlling the oscillation timings of pulse laser beams oscillated by the first pulse laser beam oscillation means 5a and the second pulse laser beam oscillation means 5b, attenuators 9a and 9b for controlling the outputs of the pulse laser beams oscillated by the first pulse laser beam oscillation means 5a and the second pulse laser beam oscillation means 5b, and a transmitting/converging means 6 for transmitting and converging the pulse laser beams oscillated by the first pulse laser beam oscillation means 5a and the second pulse laser beam oscillation means 5b. As the first pulse laser beam oscillation means 5a and the second pulse laser beam oscillation means 5b may be used a YVO4 pulse laser beam oscillator or YAG pulse laser beam oscillator for oscillating a pulse laser beam 10 having a wavelength of 1,064 nm, for example.

The above transmitting/converging means 6 comprises an optical transmitting means 7 for transmitting the pulse laser beams oscillated by the first pulse laser beam oscillation means 5a and the second pulse laser beam oscillation means 5b and a condensing lens 8 such as an objective lens for converging the pulse laser beams transmitted by the optical transmitting means 7. The optical transmitting means 7 is composed of a mirror 73 for reflecting a first pulse laser beam 11a oscillated by the first pulse laser beam oscillation means 5a toward the condensing lens 8 and a beam splitter 74 for reflecting a second pulse laser beam 11b oscillated by the second pulse laser beam oscillation means 5b toward the condensing lens 8.

Figure 6:
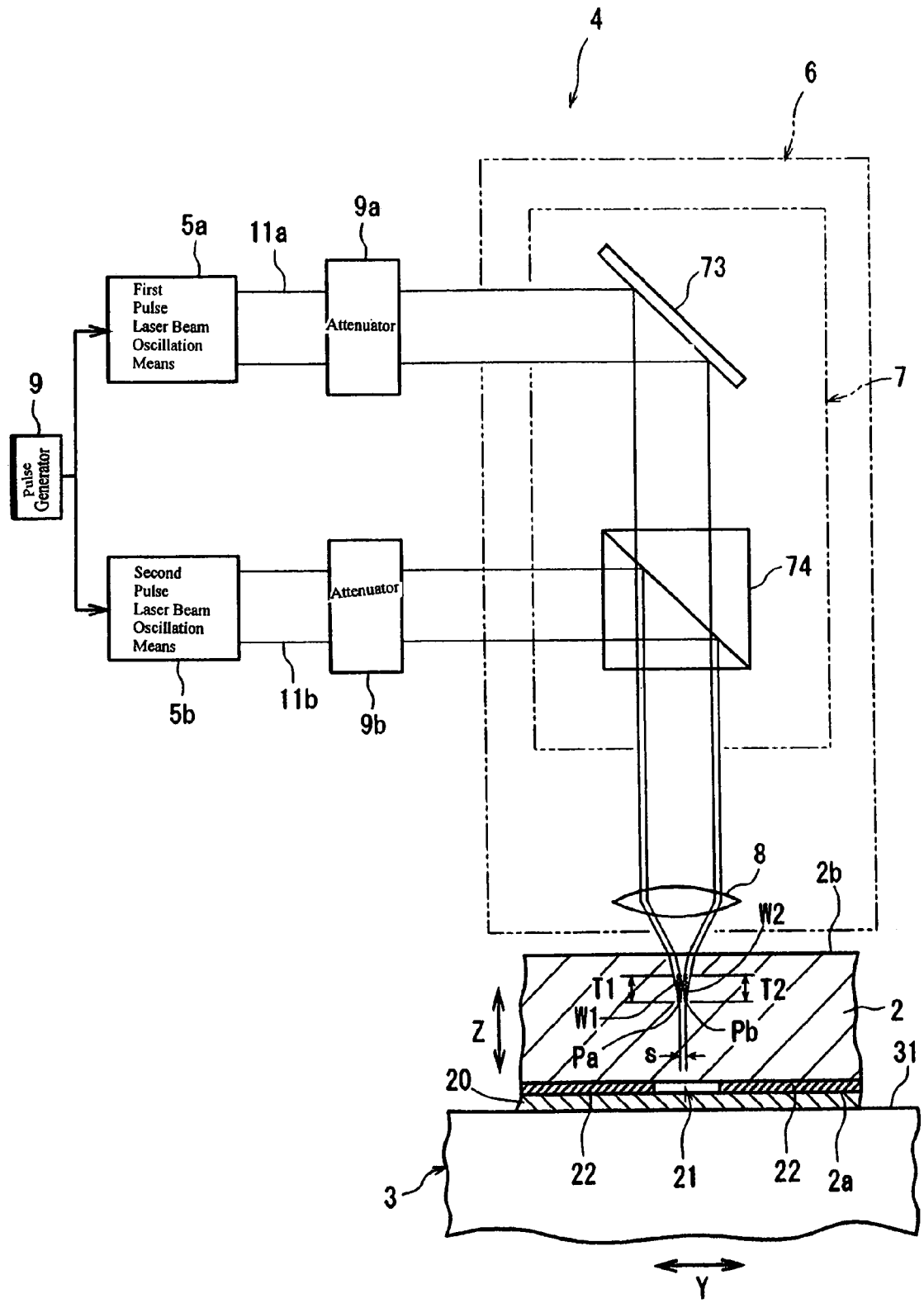
FIG. 6 is a schematic diagram of a fourth embodiment of the laser beam processing machine constituted according to the present invention.

The laser beam processing machine shown in FIG. 6 is constituted as described above, and its function will be described hereinunder.

The oscillation timings of pulse laser beams oscillated by the first pulse laser beam oscillation means 5a and the second pulse laser beam oscillation means 5b are controlled by the pulse generator 9, and the respective pulse laser beams are oscillated alternately. The output of the first pulse laser beam 11a oscillated by the first pulse laser beam oscillator 5a is controlled to a predetermined output by the attenuator 9a. The first pulse laser beam 11a whose output has been controlled to the predetermined output is reflected by the mirror 73 at an angle corresponding to its installation angle and passes through the beam splitter 74 to reach the condensing lens 8. The first pulse laser beam 11a is then converged at a focusing point Pa in the inside of the wafer 2 as the workpiece by the objective condensing lens 8.

Meanwhile, the output of the second pulse laser beam 11b oscillated by the second pulse laser beam oscillation means 5b is controlled to a predetermined output by the attenuator 9b. The second pulse laser beam 11b whose output has been controlled to a predetermined output is reflected by the beam splitter 74 at an angle corresponding to its installation angle. The second pulse laser beam 11b which has been reflected by the beam splitter 74 at an angle corresponding to its installation angle reaches the condensing lens 8. The focusing point Pb of the second pulse laser beam 11b that enters the condensing lens 8 and is converged by the condensing lens 8 is displaced from the focusing point Pa of the first pulse laser beam 11a by a predetermined space "S" in the indexing-feed direction indicated by the arrow Y in FIG. 6, that is, in the width direction (right-and-left direction in FIG. 6) of the dividing line 21 formed on the wafer 2. This displacement "S" can be suitably changed by altering the installation angle of the mirror 73 or the beam splitter 74. Since the oscillation timings of the above first pulse laser beam 11a and the second pulse laser beam 11b are controlled by the above pulse generator 9 so that the first pulse laser beam 11a and the second pulse laser beam 11b each are output alternately, they are converged in the inside of the wafer 2 as the workpiece with a time difference between pulses. Therefore, as the pulse of each of the first pulse laser beam 11a and the pulse of the second pulse laser beam 11b are applied alternately, they do not interfere with each other. By applying the first pulse laser beam 11a and the second pulse laser beam 11b along the dividing line 21 formed on the wafer 2, deteriorated layers W1 and W2 having desired thicknesses T1 and T2 can be formed at the same time near the focusing point Pa of the first pulse laser beam 11a and near the focusing point Pb of the second pulse laser beam 11b, generally in areas from the focusing point Pa and the focusing point Pb in an upward direction, respectively. By moving the chuck table 3 (therefore, the wafer 2 held on the chuck table 3) in the processing-feed direction perpendicular to the sheet in FIG. 6 while the pulse laser beam is applied, the two parallel deteriorated layers W1 and W2 are formed at the same time along the predetermined dividing line 21 in the inside of the wafer 2.

What is claimed is:

1. A laser beam processing method of forming deteriorated layers along a dividing line in the inside of a workpiece by applying a pulse laser beam of a wavelength capable of passing through the workpiece along the dividing line formed on the workpiece, said method comprising the step of:
    irradiating a plurality of pulse laser beams into the workpiece along the dividing line with a predetermined space between the laser beams with respect to an indexing-feed direction of the workpiece, perpendicular to a processing-feed direction of the workpiece, to form a plurality of parallel deteriorated linear regions on opposite sides of the dividing line.

2. The laser beam processing method according to claim 1, wherein the predetermined space is set to 1 to 5 μm.

3. A laser beam processing machine comprising
    a chuck table for holding a workpiece,
    a laser beam application means for applying a pulse laser beam of a wavelength capable of passing through the workpiece to the workpiece held on the chuck table, and
    a processing-feed means for moving the chuck table and the laser beam application means relative to each other,
    the laser beam application means comprising a laser beam oscillation means and a transmitting/converging means composed of an optical transmitting means for transmitting a pulse laser beam oscillated by the laser beam oscillation means and one condensing lens for converging the pulse laser beam transmitted by the optical transmitting means;

wherein the transmitting/converging means includes means for converging the pulse laser beam oscillated by the laser beam oscillation means through the condensing lens at two or more focusing points which are displaced from each other with a predetermined space therebetween with respect to an indexing-feed direction of the workpiece, perpendicular to a processing-feed direction of the processing-feed means such that a plurality of parallel deteriorated linear regions are formed on opposite sides of the dividing line.

4. The laser beam processing machine according to claim 3, wherein the optical transmitting means comprises a path distribution means for distributing a pulse laser beam oscillated by the pulse laser beam oscillation means to a first path and a second path and a focusing point position displacing means that is installed in any one of the first path and the second path and displaces a focusing point of one laser beam, which passes through one path and is converged by the condensing lens, in a direction perpendicular to the processing-feed direction.

5. The laser beam processing machine according to claim 4, wherein the path distribution means is composed of a beam splitter for dividing a pulse laser beam oscillated by the laser beam oscillation means to the first path and the second path.

6. The laser beam processing machine according to claim 4, wherein the path distribution means has a polarization conversion means for dividing a pulse laser beam oscillated by the pulse laser beam oscillation means into a vertically polarized beam and a horizontally polarized beam alternately and a beam splitter for dividing the vertically polarized beam and the horizontally polarized beam divided by the polarization conversion means to the first path and the second path, respectively.

7. The laser beam processing machine according to claim 6, wherein the polarization conversion means comprises a modulator for dividing a pulse laser beam oscillated by the pulse laser beam oscillation means into the vertically polarized beam and the horizontally polarized beam alternately and a pulse generator for providing a sync signal for setting a repetition frequency (f) to the pulse laser beam oscillation means and a sync signal having a frequency (f)/2 to the modulator.

8. The laser beam processing machine according to claim 7, wherein the modulator for dividing the pulse laser beam into the vertically polarized beam and the horizontally polarized beam alternately is composed of a modulation element making use an electrooptic effect.

9. The laser beam processing machine according to claim 4, wherein the path distribution means is composed of a modulator for dividing the pulse laser beam oscillated by the pulse laser beam oscillation means to the first path and the second path alternately and a pulse generator for providing a sync signal for setting a repetition frequency (f) to the pulse laser beam oscillation means and a sync signal having a frequency (f)/2 to the modulator.

10. The laser beam processing machine according to claim 4, wherein the modulator for dividing the pulse laser beam to the two paths alternately is composed of a modulation element making use of an acoustic optic effect.

11. The laser beam processing machine according to claim 4, wherein the focusing point position displacing means has a plurality of mirrors, and the displacement of the focusing point of one of the laser beams is changed by altering the installation angles of the plurality of mirrors.

12. A laser beam processing machine comprising a chuck table for holding a workpiece, a laser beam application means for applying a pulse laser beam of a wavelength capable of passing through the workpiece to the workpiece held on the chuck table, and a processing-feed means for moving the chuck table and the laser beam application means relative to each other, the laser beam application means comprising a laser beam oscillation means and a transmitting/converging means composed of one optical transmitting means for transmitting a plurality of pulse laser beams oscillated by the laser beam oscillation means and one condensing lens for converging the pulse laser beam transmitted by the optical transmitting means; wherein the laser beam application means has a plurality of laser beam oscillation means; and the transmitting/converging means converges a plurality of pulse laser beams oscillated by the plurality of laser beam oscillation means through the one condensing lens at a plurality of focusing points which are displaced from each other with a predetermined space therebetween in a direction perpendicular to a processing-feed direction.

13. The laser beam processing machine according to claim 12, wherein the laser beam application means comprises a pulse generator for controlling the oscillation timings of pulse laser beams oscillated by the plurality of laser beam oscillation means.

* * * * *